3,047,407
WATERPROOFING AGENTS FOR CEMENT
AND CONCRETE
Leonid Ehrenburg, Kaiserswertherstrasse 252,
Dusseldorf, Germany
No Drawing. Filed Aug. 17, 1955, Ser. No. 529,081
Claims priority, application Germany Nov. 23, 1954
1 Claim. (Cl. 106—12)

The present invention relates to waterproofing agents for cement or concrete mixtures and to a method of producing the same.

Although prior to this invention there have been numerous waterproofing admixtures for cement and concrete mixtures, their waterproofing qualities were often insufficient, aside from the fact that building structures which have been rendered waterproof with such materials again became pervious to water at least temporarily after they had dried out.

It is an object of the present invention to provide a waterproofing agent for cement and concrete mixtures which overcomes this mentioned disadvantage, and by means of which it is possible to make a building structure really and permanently waterproof.

A further object of the present invention is to provide a waterproofing material which may be applied either as an admixture to freshly prepared concrete mixtures, or by itself, to well-set or old concrete structures to render them waterproof, as well as acid-resistant.

Still another object of the present invention is to provide a material which may be applied like a paint to waterproof a building structure or any parts thereof.

An essential feature of the invention for attaining the above-mentioned objects resides in a mixture which contains alkali aluminate, alkali soap, alkali hydroxide, and calcium chloride. Such mixture may also be provided with a content of silicic acid, for which purpose silica gel, water glass, or the like may be added thereto. Furthermore, for specific purposes, the mixture may also be provided with a content of glycerin.

The material as provided according to the present invention will, when applied to a cement, cause the cement particles to expand and subsequently to congeal and harden in such a swollen condition. Consequently, the cement or concrete structures to which the new material has been applied will be rendered permanently waterproof. Also, the new material considerably increases the resistance of concrete against acids. It also has a very strong adhesive power both on freshly set as well as on old concrete. If prepared as a thin, watery mixture, it will penetrate into old concrete structures wherein it will likewise cause the cement particles to expand and subsequently to congeal and harden in such a swollen condition.

Thus, for example, it is possible to render a building structure waterproof by a single coating with such a watery mixture to which, if desired, certain quantities of cement or of cement and fine sand may be added.

Such watery mixtures may also be used to cement together and seal old or well-set concrete, and simultaneously to render the same waterproof, regardless of whether such old or well-set concrete is to be connected to similar concrete or whether new concrete is to be applied thereto. Consequently, such watery mixtures are also very suitable for a surface treatment, for example, of masonry of brick, clinker, natural stone, such as sandstone, graywacke, and the like, so that such surfaces may then be more easily finished or plastered. When used for such purpose, it is advisable to add the new mixture to the finishing mortar.

Still another method of treating such surfaces consists in painting or spraying the new material in a watery consistency to which cement or cement together with a fine sand has been added, upon an ordinary concrete floor. If cement is then sprinkled-in and the surface smoothed, it will also be resistant against acids.

The provision of such a slurry is possibly of the greatest advantage for patching concrete road surfaces. For this purpose, the connecting surfaces of the old concrete are treated with the watery mixture or the mentioned cement slurry so as to obtain a solid and permanent connection with the new concrete which may be prepared either in the customary manner or with an addition of the new material according to the invention.

Such surface treatments are also very important for slabs and tiles, especially those set with cement, for example, consisting of asbestos and cement, which are to be applied by means of mortar as an outer covering on stone or concrete masonry.

For producing the inventive material different procedures may be followed, one being, for example, that a solution of alkali aluminate and alkali soap is first stirred together with a solution of alkali hydroxide. Usually a milky turbidity then occurs. Then a calcium chloride solution is stirred in whereby in accordance with the concentration of the solution the liquid will more or less thicken. Concentrated watery solutions may thus be stirred up.

According to a preferred embodiment of the invention, sodium aluminate and potash soap may be used, to which glycerin may also be added, if desired, at an amount of up to 10% of the quantity of soap. As a start, a watery aluminate solution may, for example, be prepared which contains 10% of alumina,
4% of alkali-oxide,
3.5% of fatty acid, and
0.5% of glycerin.

To such a concentrated solution, first a concentrated potassium hydroxide solution and then a concentrated calcium chloride solution may be added, for which purpose substantially equal amounts may be applied.

With reference to the solid materials, approximately 1% of sodium or potassium silicate, or a mixture of both silicates may be added in the form of a water glass solution.

Another embodiment of the invention may consist of 3 parts of a fatty soap and 2 parts of a resin soap which are dissolved in water, to which, if desired, 7 parts of sodium hydroxide and 0.5 part of glycerin may be added. Approximately 36 parts of aluminum chloride and 42 parts of potassium hydroxide are then dissolved in water and mixed into the previous solution, and finally a watery solution made up of 24 parts of potassium hydroxide, 30 parts of caustic lime, and 9 parts of calcium chloride is mixed in.

The water is preferably applied in such amounts that, when working at ordinary room temperatures, the final mixture will at least have a viscous consistency.

The flocculation occurring as the result of the application of the solution containing the calcium chloride is very advantageous since the reactions which occur in the mortar mass and form the waterproofing compounds are thereby rendered more uniform. Since the waterproofing material will be partly flocculated, the course of the reactions in the mortar mass will be retarded so that the components of the mortar may be thoroughly intermixed and local accumulations of individual components of the mixture will be avoided. For obtaining the desired waterproofing effect in such concrete or mortar products and in relatively thin plaster coatings, relatively small quantities of the new material will thus suffice to render the masonry waterproof.

The invention may also be applied to other known water-soluble waterproofing agents insofar as they should first be dissolved in water and then at least partly flocculated by the addition of a precipitating agent, for example, calcium chloride, before they are mixed into the concrete or mortar mixtures.

Although my invention has been illustrated and described with reference to the preferred embodiments thereof, I wish to have it understood that it is in no way limited to the details of such embodiments or to the specific examples described, but is capable of numerous modifications within the scope of the appended claim.

Having thus fully disclosed my invention, what I claim is:

A method of producing a waterproofing agent for cement and concrete mixtures and a bonding agent for concrete, comprising the steps of preparing an aqueous solution of substantially 3 parts of a fatty soap, 2 parts of a saponifiable resin soap, 7 parts of sodium hydroxide, and 0.5 part of glycerin, stirring an aqueous solution of substantially 36 parts of aluminum chloride and 42 parts of potassium hydroxide into the first named solution, and stirring into the mixture obtained an aqueous solution of substantially 24 parts of potassium hydroxide, 30 parts of caustic lime, and 9 parts of calcium chloride.

References Cited in the file of this patent

UNITED STATES PATENTS

| | | |
|---|---|---|
| 22,836 | Williams | Feb. 1, 1859 |
| 171,720 | Dunham | Jan. 4, 1876 |
| 288,694 | Davis | Nov. 20, 1883 |
| 1,036,728 | Shafer | Aug. 27, 1912 |
| 1,082,035 | Markus | Dec. 23, 1913 |
| 1,749,923 | Reardon | Mar. 11, 1930 |
| 1,957,415 | Wechter | May 1, 1934 |
| 2,433,450 | Grant | Dec. 30, 1947 |

FOREIGN PATENTS

| | | |
|---|---|---|
| 281,022 | Great Britain | Nov. 28, 1927 |
| 577,954 | Great Britain | June 6, 1946 |
| 606,153 | Great Britain | Aug. 6, 1948 |
| 810,118 | France | Mar. 15, 1937 |
| 69,636 | Austria | Aug. 25, 1915 |